United States Patent [19]

Kleuters et al.

[11] 4,015,473
[45] Apr. 5, 1977

[54] MASS FLOWMETER FOR A GASEOUS MEDIUM, FOR EXAMPLE AIR

[75] Inventors: Wilhelm Josef Kleuters; Antonius Cornelis Maria Gieles, both of Eindhoven, Netherlands

[73] Assignee: U.S. Philips Corporation, New York, N.Y.

[22] Filed: Oct. 30, 1975

[21] Appl. No.: 627,108

[30] Foreign Application Priority Data

Nov. 6, 1974 Netherlands ............... 7414460

[52] U.S. Cl. .................... 73/205 L; 73/194 M
[51] Int. Cl.² ......................... G01F 1/38
[58] Field of Search ......... 73/205 L, 211, 194 M, 73/205 D

[56] References Cited
UNITED STATES PATENTS

| 3,349,619 | 10/1967 | Millar | 73/205 |
| 3,374,674 | 3/1968 | Schartzman | 73/211 X |
| 3,838,598 | 10/1974 | Tompkins | 73/205 |

*Primary Examiner*—Herbert Goldstein
*Attorney, Agent, or Firm*—Frank R. Trifari; Ronald L. Drumheller

[57] ABSTRACT

A mass flowmeter for gas wherein the absolute pressure at and the pressure differential across a laminar restriction are measured with diaphragms and multiplied, each diaphragm having at least one surface resistance element acting as a strain gauge, the resistance element having a resistance inversely proportional to temperature. The diaphragms and resistance elements are preferably semiconductors.

6 Claims, 3 Drawing Figures

MASS FLOWMETER FOR A GASEOUS MEDIUM, FOR EXAMPLE AIR

The invention relates to a device for measuring the mass flow of a gaseous medium, for example air, and comprising a measuring lead for the flow of medium in which a laminar restriction is incorporated, a pressure differential transducer being present which upstream and downstream of the restriction communicates with the measuring lead, furthermore an absolute pressure transducer being present which communicates at one end with the measuring lead and at the other end with a vacuum space.

For laminar flow it holds that the mass flow $$\dot{m} = c \cdot \frac{\rho \cdot \Delta P}{\eta} \quad (1)$$

wherein
$c$ = a constant
$\rho$ = density of the gas
$\Delta P$ = pressure differential on either side of the laminar restriction
$\eta$ = dynamic viscosity of the gas.

While using the ideal gas law $PV = MRT$, it may be written for $\rho$ that $$\rho = \frac{P}{RT},$$

while for a gas, for example air, of the temperature range important in practice ($-30°$ to $+40°$ C) it holds to a good approximation that $\eta$ is directly proportional to the absolute temperature T.

All this filled in in (1) provides:

$$\dot{m} = c_1 \frac{P}{T} \cdot \frac{\Delta P}{T} \quad (2)$$

wherein
$c_1$ = a constant
$P$ = absolute pressure in the measuring lead
$\Delta P$ = pressure differential on either side of the laminar restriction
$T$ = absolute temperature of the gas in the measuring lead.

From (2) it appears that by measurement of P, $\Delta$ P and T, succeeded by calculation, an accurate, temperature-corrected determination of the mass flow of a gas, for example air, is possible.

In a known device of the above-mentioned type the laminar restriction consists of a system of parallel narrow ducts. The pressure differential on either side of the restriction and the absolute pressure prevailing within the measuring lead are measured with liquid manometers which are arranged outside the measuring lead.

This known device has a few drawbacks.

Not only have liquid manometers large dimensions, which makes the device bulky, but the connection leads of the manometers to the measuring lead are also comparatively long. Long connection leads mean long paths for the pressure signals from the measuring lead to the transducer and consequently a low response rate when the gas flow varies. Moreover, the response rate is low due to the mass inertia of the liquid in the manometers. Pressure losses occur in the long connection leads so that wrong pressures are measured. This latter is still intensified in that the manometers often have a temperature which differs from the temperature of the gas in the measuring lead. For a correct temperature correction a separate temperature sensor should hence be added to each of the manometers.

It is the object of the invention to provide a device of the above-mentioned type in which the said drawbacks are avoided.

The device according to the invention is characterized in that each of the two pressure transducers is formed by a diaphragm of a semiconductor material which is provided on one side with a number of electric resistance elements by surface doping with a substance, at least one of the said elements constituting a strain gauge, the diaphragms being arranged on or near the longitudinal axis of the measuring lead within said lead.

The assembly of the semiconductor diaphragms in a central location within the measuring lead results in a very compact construction having very short connection ducts to the pressure sensing places in the measuring lead. The semiconductor diaphragm has very small dimensions (diameter, for example, smaller than 3 mm). The diaphragms are no longer influenced by ambient temperature variations so that only one temperature sensor in the measuring lead will suffice.

Pressure transducers having a diaphragm of a semiconductor material which is provided with electric resistance elements by surface diffusion of a material are known per se from British Patent No. 1,295,650. In accordance with the construction, for example, two of the four or all four resistance elements serve as strain gauges which upon flexure of the diaphragm as a result of a pressure differential prevailing on either side of said diaphragm show a variation in the electric resistance. By incorporating the resistance elements in a Wheatstone bridge arrangement fed by a current or voltage source, an output signal is obtained which is a measure of the pressure differential to be measured and an absolute pressure to be measured, respectively.

Instead of by diffusion, the resistance elements may also be formed by using implantation methods.

The resistance elements are temperature-sensitive, that is their electric resistance varies when the temperature varies. This has an unfavourable influence on the accuracy of the measured result. According to the invention, the temperature sensitivity as a negative effect is converted in a positive sense and is used to make a separate temperature sensor in the measuring leads superfluous. For that purpose, a favourable embodiment of the device is characterized in that the diaphragms consist of n-type monocrystalline silicon and the p-type resistance elements are obtained by surface doping with boron the surface concentration of which is in the order of magnitude of $5 \times 10^{18}$ atoms/cm$^3$, the resistance elements being in good heat-exchanging contact with the flow of medium.

All this is based on the recognition of the fact that at the said surface concentration the electric resistance of the elements is inversely proportional to the absolute temperature thereof.

In the case of a good thermal contact of the resistance elements with the flowing gas it is achieved that in the light of the above-mentioned formula (2) for the mass flow:

$$\dot{m} = c_1 \cdot \frac{P}{T} \cdot \frac{\Delta P}{T},$$

one semiconductor pressure transducer provides an output signal which is directly proportional to (P/T) of the measuring gas and the other semiconductor pressure transducer provides an output signal which is directly proportional to $$\frac{\Delta P}{T}$$

of the measuring gas. Separate temperature measurement in the measuring lead is therefore no longer necessary.

In order to realize a good heat exchange between the resistance elements and the flow of medium, a favourable embodiment of the device in which the laminar restriction is formed by a system of capillary ducts is characterized in that the ducts have boundary walls of a readily heat conducting material which are connected to the diaphragms in a good heat conducting manner.

According to formula (2):

$$\dot{m} = c_1 \cdot \frac{P}{T} \cdot \frac{\Delta P}{T},$$

after measuring (P/T) and $$\frac{\Delta P}{T},$$

the two measured values should be multiplied by each other. In the known device, in which P, $\Delta$ P and T are measured separately, the calculation is made by man.

In the device according to the invention, separate calculating work is no longer necessary. For that purpose, said device is characterized in that the resistance elements associated with each diaphragm are incorporated in a Wheatstone bridge circuit connected to an electric supply source and the output signal of one bridge circuit constitutes the supply source of the other bridge circuit.

In this manner, the product of (P/T) and $$\frac{\Delta P}{T}$$

is automatically obtained as a final result.

The invention furthermore relates to a device for converting calorific energy into mechanical energy having at least one combustion chamber with which communicate at least one fuel supply duct as well as at least one supply duct for air of combustion.

Such devices include internal combustion engines, hot gas reciprocating engines, hot gas turbines, and the like. According to the invention the supply duct for air of combustion comprises a device for measuring the mass flow of air as described above.

The invention will now be described in greater detail with reference to the drawing which is diagrammatic and not drawn to scale.

FIG. 1b is a cross-sectional view of the mass flow meter taken on the line 1b—1b of FIG. 1a.

Figure 1A:
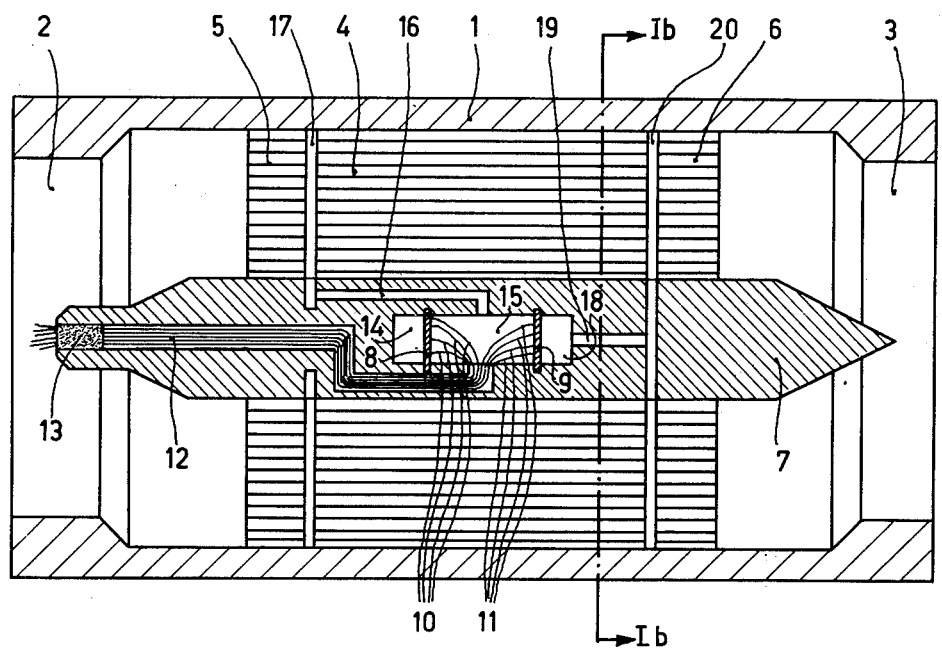
FIG. 1a is a longitudinal sectional view of an embodiment of the mass flow meter.

Reference numeral 1 in FIG. 1a denotes a measuring lead having an inlet 2 and an outlet 3 for a gas flow, for example air.

Figure 1B:
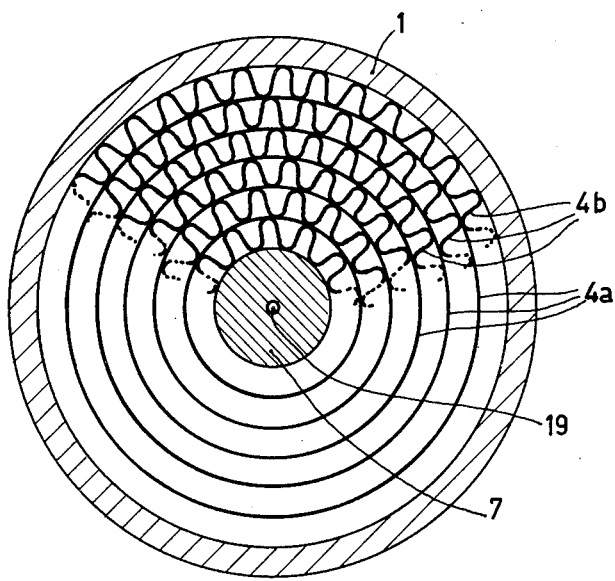

Accommodated within the measuring lead 1 is a laminar restriction 4 which is constructed from a number of mutually parallel capillary ducts, the walls of which are manufactured from a readily heat conducting material, for example copper. As shown in FIG. 1b, the ducts are formed between a number of coaxial circular-cylindrical metal strips 4a arranged at a distance from each other and corrugated metal strips 4b provided therebetween and also serving as spacing members.

Present on either side of the laminar restriction 4 are laminar auxiliary restrictions 5 and 6, respectively, which give the gas flow a laminar flow profile or cause same to maintain said profile. They may be constructed in the same manner as the laminar restriction 4.

A holder 7 of readily heat conducting material, for example copper, which is in intimate thermal contact with the duct walls of the laminar restrictions 4, 5 and 6 extends centrally within the measuring lead 1 in the axial direction.

Mounted within the holder 7 are two diaphragms 8 and 9 of n-type monocrystalline silicon which on their facing sides are provided with p-type electric resistance elements by the diffusion of boron. The surface concentration of the boron is approximately $5 \times 10^{18}$ atoms/cm$^3$. Consequently the electric resistance of said elements is inversely proportional to the absolute temperature. For a further description of the semiconductor pressure transducers reference is made to British Patent No. 1,295,650.

The resistance elements of each of the diaphragms 8 and 9 are incorporated in a Wheatstone bridge circuit to which are connected electric wires 10 and 11, respectively, for supplying and deriving a measuring signal from the bridge. The wires are led through via a duct 12 within holder 7 and a gastight seal 13.

Diaphragms 8 on its left-hand side adjoins an evacuated space 14 and on its right-hand side adjoins a space 15 which, via a duct 16, is in open communication with the inlet side 17 of laminar restriction 4. Diaphragm 8 constitutes the absolute pressure transducer. Diaphragm 9 which on its left-hand side is in open communication with the inlet side 17 of laminar restriction 4 via space 15 and duct 16, adjoins with its right-hand side a space 18 which, via a duct 19, is in open communication with the outlet side 20 of laminar restriction 4.

Diaphragm 9 constitutes the pressure differential transducer which senses the differential pressure prevailing on either side of the laminar restriction 4 during operation.

When the temperature of the gas flowing through the restrictions 5, 4 and 6 varies, the temperature of the diaphragms with their resistance elements also varies primarily by thermal conductivity of said restrictions and of holder 7. Since the electric resistance of said elements is inversely proportional to the absolute temperature, the two measured signals are automatically and in the desired manner corrected for the temperature variation of the gas.

Figure 2:
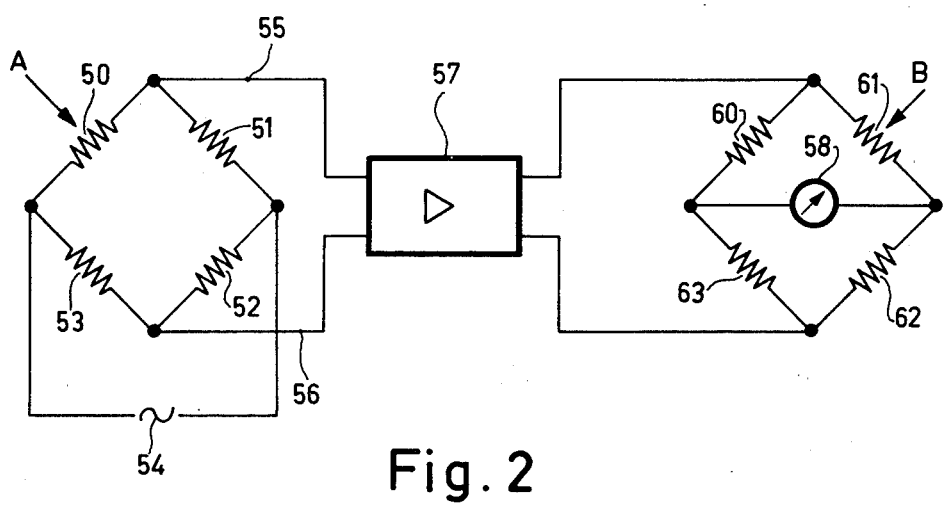
FIG. 2 shows two Wheatstone bridge circuits in which the output signal of one bridge constitutes the supply source for the other bridge.

In FIG. 2, the resistance elements 50 to 53 incorporated in a Wheatstone bridge A belong, for example, to diaphragm 8 and the resistance elements 60 to 63 incorporated in a Wheatstone bridge B belong to diaphragm 9 of FIG. 1.

A supply source 54 is connected to bridge A. The output signal of bridge A is supplied, via leads 55 and 56, to the input of a differential amplifier 57 the amplified output signal of which serves as a supply source of bridge B. In this manner it is achieved that the signal indicated by meter 58 forms the product of the output signals which otherwise the bridges would have supplied each individually.

The mass flow meter described is excellently suitably not only for measuring air in combustion engines with their often pulsatory air flow of ambient temperature, but is also extremely suitable for all kinds of other applications, for example, as an air meter in medical respiration apparatuses.

What is claimed is:

1. Apparatus for measuring the mass flow of a gas, comprising:

a laminar restriction through which a gas may flow from an inlet side to an outlet side;

an evacuated space;

a first diaphragm in open communication on one side with said evacuated space and on the other side with the gas flowing through said laminar restriction, said first diaphragm having at least one surface electric resistance element acting as a strain gauge for measuring the pressure difference between said evacuated space and the gas flowing through said laminar restriction, said at least one resistance element of said first diaphragm having a resistance inversely proportional to temperature and being in good heat-exchanging contact with the gas flowing through said laminar restriction;

a second diaphragm in open communication on one side with the inlet side of said laminar restriction and on the other side with the outlet side of said laminar restriction, said second diaphragm having at least one surface electric resistance element acting as a strain gauge for measuring the pressure difference between the inlet and outlet side of said laminar restriction, said at least one resistance element of said second diaphragm having a resistance inversely proportional to temperature and being in good heat-exchanging contact with the gas flowing through said laminar restriction; and circuit means for multiplying the pressure difference measured by said at least one resistance element of said first diaphragm by the pressure difference measured by said at least one resistance element of said second diaphragm, the product being a measure of the mass flow of the gas flowing through said laminar restriction.

2. Apparatus as defined in claim 1 wherein said first and second diaphragms comprise n-type monocrystalline silicon and said at least one surface resistance elements comprise p-type monocrystalline silicon.

3. Apparatus as defined in claim 2 wherein said at least one surface resistance elements have a boron concentration on the order of $5 \times 10^{18}$ atoms/cm$^3$.

4. Apparatus as defined in claim 1 wherein said laminar restriction comprises a system of capillary ducts formed of a readily heat conducting material in good heat-exchanging contact with said first and second diaphragms.

5. Apparatus as defined in claim 1 wherein said circuit means comprises a first Wheatstone bridge circuit incorporating said at least one resistance element of one of said diaphragms and a second Wheatstone bridge circuit incorporating said at least one resistance element of the other of said diaphragms, the output signal of one of said bridge circuits acting as the electric supply source for the other of said bridge circuits.

6. Apparatus as defined in claim 1 wherein said first diaphragm is in open communication on said other side with the inlet side of said laminar restriction.

* * * * *